United States Patent Office 3,227,618
Patented Jan. 4, 1966

3,227,618
DENTIFRICE COMPOSITION CONTAINING
SODIUM MONOFLUOROPHOSPHATE
Roderick David Manahan, Dunellen, and Virgil John Richter, West Orange, N.J., assignors to Colgate-Palmolive Company, New York, N.Y., a corporation of Delaware
No Drawing. Filed Mar. 9, 1964, Ser. No. 350,578
20 Claims. (Cl. 167—93)

The present invention relates to a dentifrice preparation comprising sodium mono-fluorophosphate as hereinafter described.

The present application is a continuation-in-part of pending application S.N. 238,017, filed November 15, 1962, and of pending application S.N. 654,911, filed March 14, 1957.

Certain fluoride compounds have been used as additives to drinking water or for topical application on the teeth in the form of an aqueous solution. By such application, it is believed generally that the fluoride renders the tooth structure more resistant to the effect of acid in the mouth.

It has been proposed that fluoride compounds be incorporated in dentifrices. Enamel solubility tests have shown that the effectiveness of water-soluble fluorides such as sodium fluoride is diminished when used in the presence of certain dentifrice constituents such as calcium carbonate, dicalcium phosphate or similar materials as shown by Bibby, The Journal of the American Dental Association, vol. 34, January 1, 1947, pages 26–32. It has been found that such calcium-containing phosphates, e.g. di- and tri-calcium orthophosphates, remove the soluble fluoride from solution as described by MacIntire et al. and Adler et al. in Industrial and Engineering Chemistry, vol. 30, pages 160–162 and pages 163–165 respectively. It has been shown furthermore that the heat-treatment of such calcium-containing phosphates, e.g. about 500° C. for 15 to 30 minutes, results in a product which has substantially less adsorptive capacity for soluble fluoride, as shown for example by Current Science of India, November 1951, pages 293–4. It has been disclosed also that treatment of tooth enamel with a mixture of stannous fluoride, hydrogen peroxide and insoluble sodium metaphosphate increases the enamel hardness as described in The Journal of the American Dental Association, May 1950, vol. 40, pages 513–519.

A large variety of polishing agents for dentifrice compositions is known in the art, including insoluble sodium metaphosphate as disclosed in U.S. Patent No. 2,019,142. It has been proposed that various calcium or magnesium compounds may be admixed with insoluble sodium metaphosphate in order to modify certain physical properties of the compositions as disclosed in U.S. Patent Nos. 2,216,816 and 2,216,821 for example.

Various complex fluoride compounds have been examined in preliminary screening tests in the laboratory involving in vitro or animal studies of their relative effectiveness for possible anti-cariogenic ability, particularly in comparison to fluorides such as sodium fluoride and stannous fluoride. Among the complex fluorine-containing materials subjected to such tests were certain fluorosilicates and fluorophosphates. As early as 1950, sodium monofluorophosphate was subjected to such tests and, in general, reported to have an effect comparable to sodium fluoride by Shourie et al. in The Journal of Dental Research, 1950, pages 529–533, and a number of publications thereafter. During 1954 to 1957, certain data was published indicating the relative ineffectiveness of sodium monofluorophosphate. In The Journal of Dental Research, October 1954, page 676, it was reported that dental caries studies on animals disclosed that sodium hexafluorophosphate was effective and sodium monofluorophosphate was ineffective in the inhibition of dental caries. It was further reported that sodium monofluorophosphate was essentially ineffective on certain tooth structure in The Journal of Dental Research, February 1956, pages 59–64, and in The Journal of Dental Research, 1957, pages 889–894.

There are a number of factors involved in the development of an effective dentifrice, even after the selection for possible use in a dentifrice of an anti-decay agent which has shown great effectiveness in such in vitro and animal studies. Some of the factors involved in the laboratory evaluation of potential anti-caries agents in dentifrices generally are disclosed in The Journal of the Society of Cosmetic Chemists, vol. 7, 1956, pages 434–443. It has also been reported that various detergents inhibit or interfere with the action of fluoride salts when applied to enamel in vitro, as disclosed in The Journal of Dental Research, October 1953, page 703, No. 170.

It has now been found that dentifrice preparations which are highly effective for the care and hygiene of the mouth, and exhibit superior characteristics for the protection of the teeth may be prepared using sodium monofluorophosphate which releases monofluorophosphate ions in water in admixture with various compatible materials. The dental preparation containing said compound is compatible with suitable amounts of insoluble alkali metal metaphosphate polishing agent, and with calcium or magnesium inorganic salts, surface-active agents, gum, etc., as described.

In particular, there should be used for optimum proven effect a compatible polishing material comprising a mixture of a major proportion of an insoluble alkali metal metaphosphate and a minor proportion of a material selected from the group consisting of insoluble calcium and magnesium polishing agents.

It has been found that such preparations are particularly effective for the protection of the teeth against tooth decay and for desensitization of the teeth. Such mixtures of polishing agents with sodium monofluorophosphate inhibit the solubility of enamel in acid solutions using enamel solubility tests and do not substantially remove said monofluorophosphate ions from solution. In addition, such effects do not appear to be substantially decreased upon aging, but rather the beneficial properties are maintined at high levels of activity for comparatively long periods of time as compared to other fluoride-containing dentifrices.

A feature of the present application relates to a dentifrice preparation which comprises sodium monofluorophosphate normally releasing fluorophosphate ($PO_3F$) ions in water, said fluorophosphate being in an effective amount containing above 0.01% fluorine (100 p.p.m.) to a maximum of about 1% fluorine and preferably up to 2% fluorophosphate by weight of the dentifrice in combination with at least 20% of the water-insoluble polishing material which does not substantially remove said fluorophosphate ions from aqueous solution. Thus, the polishing material should be free from calcium and magnesium polishing agents in an amount which substantially removes said fluorophosphate ions from aqueous solution. There should be included usually about 0.05% to 10% by weight of a suitable water-soluble, non-soap organic detergent. As a result, said fluorophosphate is maintained substantially in active form in said dentifrice which is particularly effective for inhibiting dental caries, etc., said fluorophosphate being available for the protection of the teeth upon aging of said dentifrice, and exhibiting simultaneously effective detersive, abrasive and polishing power in the cleansing of the teeth during the use of the dentifrice.

Various dental creams have been subjected to a number of clinical tests involving many hundreds of human beings to determine their effectiveness against tooth decay since it is recognized that such tests are the ultimate criterion of effectiveness. The formulations of Examples I, II and III herein were all found to be effective against tooth decay in clinical tests.

For example, a clinical test was conducted over a two year period involving hundreds of children, comparing a dental cream having substantially the basic formula described with two commercial dental creams which have been reported in various publications as effective against tooth decay. The test dental cream contained 0.76% sodium monofluorophosphate (1000 p.p.m. fluorine), 42% insoluble sodium metaphosphate, 5% anhydrous dicalcium phosphate, about 1% of sodium N-lauroyl sarcosinate and 0.75% sodium lauryl sulfate, 27% humectant of glycerin and sorbitol, with the balance primarily water and miscellaneous agents. One of the commercial dental creams contained 0.4% stannous fluoride (1000 p.p.m. fluorine) formulated in a base containing calcium pyrophosphate as the polishing agent. The second commercial dental cream contained 2% sodium N-lauroyl sarcosinate in a compatible base containing dicalcium phosphate dihydrate as the principal polishing agent.

The clinical test results have been published in The Journal of Dentistry for Children, vol. XXX, 1963, pages 17-25, by Finn and Jamison. It was found that the sodium monofluorophosphate cream showed a markedly and significantly greater reduction in caries compared to both commercial dental creams in every category of caries measurement for the two years of the clinical trial. The sodium monofluorophosphate cream was found to reduce tooth decay approximately 20-30% greater than either of the two commercial dental creams at the end of two years.

It was further found that there was no significant loss of effectiveness with time in the case of the monofluorophosphate dental cream in contrast to the known loss of effectiveness upon aging in the case of the stannous fluoride-calcium pyrophosphate cream. This factor is illustrated by a comparison of the analytical data (average values) on said sodium monofluorophosphate dental cream and the stannous fluoride-calcium pyrophosphate dental cream in the table below. There are included also similar data for a dental cream containing 0.4% stannous fluoride with the same mixture of polishing agents as the monofluorophosphate dental cream, i.e. about 41% insoluble sodium metaphosphate (IMP) and 5% anhydrous dicalcium phosphate (DCP). The recorded data are as follows:

stannous fluoride creams as evidenced by the available amount of soluble fluoride in aged samples.

Over long-time aging, e.g. two years, it has been found that there is some hydrolysis of the sodium monofluorophosphate in the dental cream but it is relatively minor and it has been noted also that the amount of available soluble fluoride remains essentially unchanged and at a high level.

It has been found in clinical studies also that said monofluorophosphate dentifrice is effective in alleviating tooth sensitivity. Such study is considered as measuring the effect of the dentifrices to routine sensitivity. Sensitivity of the teeth was found by scratching the area in question with an explorer and eliciting pain. The exact tooth and tooth area were then recorded so that it could be rechecked after treatment. The subjects were examined after 4 weeks of use of the dentifrice with a toothbrush in the usual way during this period.

It was found that dentifrice A containing the 0.76% sodium monofluorophosphate (1000 p.p.m. fluorine) with a mixture of 42% insoluble sodium metaphosphate and 5% dicalcium phosphate gave relief (reduction of sensitization of the teeth) in 66% of the individual teeth and in 75% of the individuals. Such results were superior to a dentifrice B placebo (without monofluorophosphate), a dentifrice C containing formalin as a de-sensitizing agent, and a dentifrice D containing 0.4% stannous fluoride (1000 p.p.m. fluorine) with essentially the same polishing agents, i.e. 41% insoluble sodium metaphosphate and 5% dicalcium phosphate. The results are set forth below in terms of the ratio of the de-sensitizing effect found compared to the number with no effect, both by subject and by individual teeth.

RATIO OF DE-SENSITIZING EFFECT : NO EFFECT

| Dentifrice | Ratio by subject | Ratio by Teeth |
| --- | --- | --- |
| A | 3:1 | 2:1 |
| B | 1.3:1 | 0.9:1 |
| C | 1.4:1 | 1:1 |
| D | 0.8:1 | 0.8:1 |

A number of animal caries studies were made also using a technique which involved swabbing the teeth of the animals daily with a 50% slurry of a dentifrice. It was reported that the above sodium monofluorophosphate dentifrice with about 42% insoluble sodium metaphos-

SUMMARY OF ANALYTICAL DATA ON MONOFLUOROPHOSPHATE AND STANNOUS FLUORIDE CREAMS

| Age When Analyzed | Monofluorophosphate +IMP and DCP | | $SnF_2$+Ca Pyro. | | $SnF_2$+IMP and DCP | |
| --- | --- | --- | --- | --- | --- | --- |
| | Tot. Sol. Fluoride (p.p.m.) | Sol. Fluorophosphates as percent $Na_2FPO_3$ | Soluble Fluoride | Sol. Sn Ions | Soluble Fluoride | Sol. Sn Ions |
| 1-2 weeks | 978 | 0.77 | | | [1] 730 | 2,300 |
| 1 month | 939 | 0.73 | 450 | 2,200 | 607 | 2,120 |
| 3 months | 988 | (²) | 410 | 658 | 587 | 1,040 |
| 6 months | 988 | 0.74 | 273 | 160 | 450 | 300 |
| 12-13 months | 900 | (²) | 238 | 65 | | |

[1] 1½ months.
[2] Not run.

It is clear that the sodium monofluorophosphate is stable and compatible with the other ingredients in the dentifrice and the age of the dentifrice used in the study has no importance. The difference in stability between these three dental creams is clearly evident also. While the stannous fluoride formula with the IMP-DCP polishing agents is superior to the formula containing calcium pyrophosphate as the abrasive, the data show that the monofluorophosphate cream is markedly superior to both phate and 5% dicalcium phosphate gave an average of over a 60% reduction in caries on female animals and about 25% better on male animals compared to a placebo dentifrice. A similar test using a dentifrice containing stannous fluoride with the same mixture of polishing agents gave an average of 22% reduction on females and 26% on males. Other tests such as for toxicity, etc. confirm that these monofluorophosphate dentifrices are safe, reliable and effective for unrestricted public use. The exact mechanisms whereby said sodium monofluorophosphate dentifrices exert such superior properties is not known at this time.

The presence of said mixture of insoluble sodium metaphosphate and alkaline earth metal polishing agents is particularly advantageous. In addition to modification of the physical properties, it has been found that the minor amount of dicalcium phosphate or the like in said mixture exerts a function or property unique with the fluorophosphate. The mixture of polishing agents results in unusually improved stability and inhibition of hydrolysis of the monofluorophosphate ion at elevated temperatures such as 120–140° F. At room temperature aging of aqueous slurries of commercial sodium monofluorophosphate and the polishing agents listed below, it was found that the quantity of monofluorophosphate was essentially unchanged by the presence of the insoluble sodium metaphosphate and dicalcium phosphate dihydrate.

Such preparations were aged for 72 hours at 140° F. for accelerated aging and indication of the effect of elevated temperature. Aqueous slurries of commercial sodium monofluorophosphate (1.52 gms.), polishing material (100 gms.) and water (100 gms.) were studied in comparison to the aqueous sodium monofluorophosphate solution alone as a control. The data obtained are set forth in the following table.

TABLE I $Na_2PO_3F$ with:             $Na_2PO_3F$ at 140° F. (mg./ml)

(a) No polishing agent (control) _____ 1.5
(b) Dicalcium phosphate (100 gms.) _____ 0.1
(c) Insoluble sodium metaphosphate (100 gms.) _____ 0.6
(d) 10% dicalcium phosphate+90% insoluble sodium metaphosphate (100 gms. total)—
    Expected value _____ 0.55
    Determined value _____ 0.7

It will be apparent that there is substantial loss or hydrolysis of the monofluorophosphate in the presence of the insoluble sodium metaphosphate polishing agent by heating at 140° F., and even greater in the case of the dicalcium phosphate alone. The combination of the dicalcium phosphate and IMP resulted in decreased hydrolysis of fluorophosphate to fluoride as compared to the IMP alone, the combination showing 0.7 mg. which was about 30% greater than the expected value of 0.55 mg. It is apparent that the presence of the minor proportion of the calcium compound with the insoluble sodium metaphosphate improved the elevated temperature stability of the fluorophosphate.

It has been found that such sodium monofluorophosphate dentifrices are highly stable at elevated temperatures. In general, experience with fluorine-bearing salts in dentifrices indicates that there is a decrease in soluble fluoride which is accelerated by higher temperatures. Comparison of said monofluorophosphate dental cream (with the described IMP and DCP polishing mixture) with a stannous fluoride cream (with the same polishing mixture) after aging for a number of weeks at 120° F. disclosed that the total soluble fluoride was essential unchanged in the monofluorophosphate cream (with the major amount of fluorine being as fluorophosphate) whereas the total soluble fluoride was about two-thirds of the original amount in the case of the stannous fluoride product.

The total soluble fluoride in said monofluorophosphate is indicative of the amount of soluble fluorine present and does not distinguish between the presence of the fluorine as fluoride ion or the fluorophosphate $PO_3F$ ion. The difference between the total soluble fluoride and the soluble fluorine in the $PO_3F$ ion content is indicative of the minor amount of fluoride ion ($F^-$) present as an impurity initially present with the sodium monofluorophosphate and any additional amounts formed by hydrolysis in combination with the polishing agent and other ingredients. When monofluorophosphate hydrolyzes, it is converted normally to fluoride and phosphate. Heretofore, there does not appear to have been known from the literature a reliable analytical method for the determination of monofluorophosphates in dental cream. Fundamental studies of its chemistry have led to the development of satisfactory methods for the assay of commercial sodium monofluorophosphate and its determination at low levels in dentifries. A summary of such analytical procedures is included hereinafter.

For analytical purposes, the sodium monofluorophosphate is assayed by precipitating the monofluorophosphate with silver, leaving the free fluoride in solution. Analysis of the fractions for fluorine by classical methods allows for measurement of both $F^-$ and $PO_3^=$. Other techniques which may be employed upon suitable standardization include infrared spectroscopy and ion exchange columns.

In dental preparations, modified procedures have been developed for determination of sodium monofluorophosphate and total soluble fluoride. The determination of sodium monofluorophosphate is based upon complete precipitation by silver. After removal of the soluble organic matter by filtration, the precipitate is ashed in the presence of calcium oxide to remove the organic material. The fluoride is determined by the usual distillation procedure and calculated as sodium monofluorophosphate. The total soluble fluoride is based upon the removal of water insoluble materials by centrifugation. The supernatant liquid is evaporated and ashed in the presence of calcium oxide to remove the organic material. The fluoride is determined by distillation and calculated as total soluble fluoride (as F).

It is desirable of course to control or standardize the quality of the fluorophosphate material in order to insure that the dentifrice will exhibit satisfactory performance and physical characteristics in use by the public on a commercial or mass distribution basis. Furthermore, there are several methods known for the manufacture of sodium monofluorophosphate. Depending upon the particular method and commercial processing conditions, it is possible to obtain material of variable purity with different types or amounts of impurities, by-products, unreacted materials, etc. The usual method of manufacture is based on a fusion reaction between sodium fluoride and a sodium phosphate.

In general, commercial sodium monofluorophosphate material necessary for commercial production should desirably have a purity of at least 85% and effective for the desired properties such as the inhibition of the solubility of tooth enamel in acid solution or the like. It should preferably have a purity of at least about 90%, e.g. 90–99% in practice, with the balance being primarily free sodium fluoride and other inorganic non-fluoride salts such as sodium phosphates generally. The theoretical amount of fluorine is 13.2% in the monofluorophosphate. In particular, the specification for its use in a dentifrice should preferably be as follows: (a) above 12% and particularly at least about 12.7% total fluoride (as F), (b) up to 1.5% and particularly up to about 1.2% free sodium fluoride (as F), and (c) at least about 12% particularly 12.1% minimum of sodium monofluorophosphate (as F). Examples of suitable grades are:

|  | A | B | C |
|---|---|---|---|
| Total Fluoride (as F) | 12.5 | 12.9 | 12.3 |
| Free Sodium Fluoride (as F) | 0.5 | 0.4 | 0.4 |
| Sodium Monofluorophosphate (as F) | 12.0 | 12.5 | 11.9 |

Typical analyses of various other grades or batches of commercial sodium monofluorophosphates which have been found suitable in the past are as follows:

|  | D | E | F | G | H |
|---|---|---|---|---|---|
| Total Fluorine (as F) | 12.1 | 13.1 | 13.3 | 13.1 | 13.1 |
| Sodium Fluoride (as F) | 0.9 | 1.5 | 1.3 | 1.3 | 1.7 |
| $Na_2PO_3F$, percent | 85 | 88.2 | 90.9 | 88.9 | 94.5 |

Further analysis of sample E disclosed the presence of about 1.5% orthophosphate calculated as $Na_3PO_4$ and 1.1% pyrophosphate calculated as tetrasodium pyrophosphate.

Other desirable characteristics include the following: (a) color—white to gray; (b) odor—odorless; (c) texture—fine powder, e.g. with a fineness of 2% maximum retained on a U.S. No. 10 sieve by the dry method; (d) heavy metal content—less than 30 p.p.m., preferably 10 p.p.m. maximum; (e) arsenic—nil; (f) moisture loss at 105° C.—0.2% maximum; (g) insoluble matter in water—no more than a slight turbidity in 2% solution; (h) pH within the range of 7 to 9 and preferably about 7 to 8 in 2% aqueous solution. Variations are possible if desired provided of course that the quality or effectiveness of the material is not substantially adversely affected thereby.

The amount of sodium monofluorophosphate is dependent to some extent upon the type of dentifrice composition, but should be an effective but non-toxic amount. Dentifrice compositions containing a maximum of about 1% by weight fluorine are satisfactory. In the case of sodium monofluorophosphate, this corresponds to about 7.6% of the compound in the dentifrice. Any suitable minimum amount of said fluorophosphate may be used but it will be usual to employ an effective amount containing above 0.01% fluorine (100 p.p.m.). It is preferred that the amount of the monofluorophosphate salt be no more than 2%, and usually within the range of 0.05 to about 1%, by weight of the dentifrice composition.

In these dentifrice preparations, the polishing material exerts the desired cleansing, abrasive and polishing properties for the teeth. In the case of dentifrices such as tooth pastes and tooth powders, the total content of polishing agents will be usually at least about 20%, such as about 20–99% by weight depending upon the specific composition. In tooth pastes, the polishing material will total about 20 to 75%, usually about 40 to 60%, whereas in tooth powders the polishing material will be usually about 70–95% by weight.

The insoluble alkali metal metaphosphates are preferably the insoluble sodium and potassium salts of polymetaphosphoric acid. These materials are known in the art with the insoluble sodium metaphosphate having been suggested as a polishing agent as previously indicated. Such materials may be formed in any suitable manner, as illustrated by Thorpe's Dictionary of Applied Chemistry, vol. 9 (4th ed.), pp. 510–511. The forms of insoluble sodium metaphosphate known as Madrell's salt and Kurrol's salt are further examples of suitable materials. These metaphosphate salts exhibit only a minute solubility in water, and are commonly referred to as insoluble metaphosphates therefor. There is present a minor amount of soluble phosphate material as impurities, usually of the order of a few percent such as up to about 4% by weight. The amount of soluble phosphate material which is believed to be a soluble sodium trimetaphosphate in the case of insoluble sodium metaphosphate may be reduced by washing with water if desired.

Any substantially water-insoluble calcium or magnesium polishing agent may be used also. Suitable examples are calcium carbonate, dicalcium phosphate dihydrate, magnesium carbonate, trimagnesium phosphate or magnesium orthophosphate, tricalcium phosphate, calcium sulfate and the like. Another preferred embodiment is the use of a calcium phosphate polishing agent such as anhydrous dicalcium phosphate ($CaHPO_4$) which may be used in any suitable form and particle size, and methods for its manufacture being known also.

Since these calcium or magnesium materials exhibit in varying degree a tendency to react with soluble fluorides, it is important to use only such proportions which do not substantially remove the complex fluoride ions from solution. The maximum amount of calcium or magnesium salts will vary, depending upon the nature of the calcium or magnesium salt and the type of dentifrice composition. In general, the insoluble alkali metal metaphosphate should be a major proportion (i.e. at least 50%) and the insoluble calcium or magnesium compound a minor proportion (i.e. up to 50%) of such mixtures since they result in optimum effects. Effective mixtures which are particularly desirable will be found within the range of alkali metal metaphosphate to the alkaline earth metal compounds from about 100:1 to about 3:2 by weight, and usually about 50:1 to 4:1, depending upon the specific composition. Particularly effective results have been obtained with ratios in the order of 9:1 by weight of the alkali metal metaphosphate to the calcium or magnesium polishing agents. This combination may be the sole polishing material or it may be admixed with a suitable proportion of other polishing materials such as alumina and the like, provided that they do not substantially adversely affect the special characteristics of the product.

There are described below test procedures for determining the effectiveness of compositions or mixtures of the present invention in inhibiting the solubility of tooth enamel to acid solution. For example, the preferred polishing material, viz. insoluble sodium metaphosphate (e.g. 20 or 22.5 gms.) and various calcium-containing polishing materials (e.g. 2.5 or 5 gms.) specified below, and with 100 ml. of the fluoride containing 0.1 or 0.5% fluorine in aqueous solution are shaken for 15 minutes to one hour. The mixtures are filtered and each of the filtrates is mixed with 200 mgs. of powdered enamel for 15 minutes, after which the treated enamel is separated by screening, and then washed and dried. Samples of enamel from each treatment are tested then for solubility in acid solution. Each enamel sample (50 mg.) is put in 20 cc. of 0.2 molar sodium acetate: acetic acid buffer at a pH of 4 and shaken for one hour. The mixtures are analyzed for calcium dissolved by the acid in each case. The percent reduction in enamel solubility in acid may be calculated then for each mixture by comparing the amount of calcium dissolved by the acid after treatment with each mixture, with the amount dissolved from untreated enamel by the acid as the control. Suitably compatible polishing materials permitting substantial reduction in the solubility of tooth enamel in acid are said metaphosphate admixed with suitable amount of dicalcium phosphate dihydrate, tricalcium phosphate, and calcium carbonate.

Any suitable surface active or detersive material may be included in the dentifrice compositions. Such compatible materials are desirable to provide additional detersive, foaming and anti-bacterial properties depending upon the specific type of surface active material and are selected similarly. These detergents are water-soluble organic compounds usually, and may be anionic, non-ionic or cationic in structure. It is preferred to use the water-soluble non-soap or synthetic organic detergents usually. Suitable detersive materials are known and include, for example, the water-soluble salts of higher fatty acid monoglyceride monosulfate detergent (e.g. sodium coconut fatty acid monoglyceride monosulfate), higher alkyl sulfate (e.g. sodium lauryl sulfate), alkyl aryl sulfonate (e.g. sodium dodecyl benzene sulfonate), higher fatty acid esters of 1,2-dihydroxy propane sulfonate (e.g. sodium coconut fatty acid ester of 1,2-dihydroxy propane sulfonate), and the like.

The various surface active materials may be used in any suitable amount, generally from about 0.05 to about 10% by weight, and preferably from about 0.5 to 5% by weight of the dentifrice composition.

It is a further embodiment of the present invention to use the substantially saturated higher aliphatic acyl amides of lower aliphatic amino carboxylic acid compounds, such as those having 12 to 16 carbons in the acyl radical, and as more particularly described in U.S. Patent No. 2,689,170, issued Sept. 14, 1954. The amino acid portion is derived generally from the lower aliphatic saturated monoaminocarboxylic acids having about 2 to 6 carbons, usually the monocarboxylic acid compounds. Suitable compounds are the fatty acid amides of glycine, sarcosine, alanine, 3-amino-propanoic acid and valine having about 12 to 16 carbons in the acyl group. It is preferred to use the N-lauroyl, myristoyl and palmitoyl sarcoside compounds however for optimum effects.

The amide compounds may be employed in the form of the free acid or preferably as the water-soluble salts thereof, such as the alkali metal, ammonium, amine and alkylolamine salts. Specific examples thereof are sodium and potassium N-lauroyl, myristoyl and palmitoyl sarcosides, ammonium and ethanolamine N-lauroyl sarcoside, N-lauroyl sarcosine, and sodium N-lauroyl glycide and alanine. For convenience herein, reference to "amino carboxylic acid compound," "sarcoside," and the like refers to such compounds having a free carboxylic group or the water-soluble carboxylate salts.

Such materials are utilized in pure or substantially pure form. They should be as free as practicable from soap or similar higher fatty acid material which tends to reduce the activity of these compounds. In usual practice, the amount of such higher fatty acid material is less than 15% by weight of the amide and insufficient to substantially adversely affect it, and preferably less than about 10% of said amide material.

A preferred embodiment relates to a dentifrice preparation comprising said fluoride material, said amide compound and a mixture of insoluble sodium metaphosphate and anhydrous dicalcium phosphate as a polishing material. Such dental composition exhibits a prolonged and marked effect in the inhibition of acid from fermentable carbohydrates by the oral flora, and a marked increase in the resistance (lowering solubility) of tooth enamel to acid solutions. There is produced thereby dual protective mechanisms acting simultaneously to inhibit caries.

In accordance with the present invention, the specified combinations of ingredients may be used in any suitable preparation designed for application to the oral cavity which is referred to herein as a dentifrice preparation. Such dentifrices may be in solid, liquid or paste form and include tooth pastes or dental creams, tooth powders, liquid dentifrices, tablets and the like.

In the preparation of tooth powders, it is usually sufficient to mechanically admix the various solid ingredients. A suitable basic formula contains 4% sodium N-lauroyl sarcoside, 82.95% insoluble sodium metaphosphate, 10% anhydrous dicalcium phosphate, 0.15% soluble saccharin and 2.5% flavor. A minor amount (e.g. 5%) of magnesium silicate may be added or partially substituted for the dicalcium phosphate to adjust the density and other physical properties if desired.

In dental cream formulations, the liquids and solids should necessarily be proportioned to form a creamy mass of desired consistency which is extrudible from a collapsible aluminum or lead tube for example. In general, the liquids in the dental cream will comprise chiefly water, glycerine, sorbitol, propylene glycol, or the like, including suitable mixtures thereof. It is advantageous usually to use a mixture of both water and a humectant or binder such as glycerine or sorbitol. As shown in the following example, it is preferred to use a mixture of glycerine and sorbitol. The total liquid content will generally be about 20–75% by weight of the formulation. It is preferred to use also a gelling agent in dental creams such as the natural and synthetic gum and gum-like material, e.g. Irish moss, gum tragacanth, sodium carboxymethylcellulose, polyvinylpyrrolidone, starch and the like. The Irish moss and sodium carboxymethylcellulose are compatible particularly and are preferred gelling agents as illustrated. The gum content is usually in an amount up to about 10% and preferably about 0.5–5% by weight of the formulation.

Other types of dentifrice compositions will be formulated in known manner also.

A minor amount of hydrated aluminum oxide may be incorporated in the dentifrice preparation. More particularly, a dental cream having improved physical properties may be prepared from a mixture of the insoluble alkali metal metaphosphate and an insoluble calcium salt suspended in a gel comprising water, humectant and gelling agent, with said fluoride compound and organic non-soap synthetic detergent, and a minor amount of hydrated aluminum oxide, said dental cream having a pH from about 5 to 6.5. These dental creams exhibit a superior degree of stability to aging for long periods of time, particularly at elevated temperatures. The aluminum oxide acts as a stabilizing and modifying agent so as to eliminate or inhibit any tendency for separation or "bleeding" of the dental cream in the collapsible tube.

Suitable examples of hydrated aluminum oxide which may be employed are the forms known as alpha and beta aluminum oxide trihydrate and mixtures thereof. It is used usually in the form of fine particles of any desired particle size in the manufacture of the dental cream. In practice, it is preferred to use the alpha trihydrate form of which at least about 90% of the particles pass through on a U.S. standard No. 325 mesh sieve and not more than about 5% of the particles by weight are less than 5 microns. It has been found that amounts of hydrated aluminum oxide from about ¼ to about 10% by weight are most desirable. In commercial practice it is preferred that the dental cream comprise the insoluble metaphosphate in an amount from about 40 to 50%, a calcium phosphate in an amount from ½ to 10%, and the hydrated aluminum oxide from about ½ to 10%, preferably 1–5% by weight with about 10–40% each of water and humectant.

The dental creams should have a pH practicable for use. The pH range of about 5 to 6.5, preferably 5.2 to 6.2, is considered the most practicable for use. Where reference is made to pH herein, it is intended that such pH determination be made on the dental cream directly. If necessary, acidifying agents or basic materials may be added to adjust the pH as desired. For example, a suitable acidifying agent such as citric acid or other weak organic acid may be employed in varying amount if necessary to adjust the pH of the dental cream.

There may be employed also various calcium and magnesium ion suppression agents for adjustment of physical properties of the compositions. Suitable agents are the water-soluble inorganic polyphosphate salts, such as tetrasodium pyrophosphate or disodium diacid pyrophosphate, with the partially neutralized or acid polyphosphates preferred. Other suitable agents are the alkali metal, preferably sodium, salts of citric acid. In general, such compounds will be a minor amount or proportion of the formulation. The precise amount will vary depending upon the specific formulation, such as the physical characteristics of the dental cream, but will usually be from about 0.1% to about 3% by weight.

The following specific examples are further illustrative of the nature of the present invention, but it is to be understood that the invention is not limited thereto. The compositions are prepared in the usual manner and all amounts of the various ingredients are by weight unless otherwise specified.

*Example I.—Dental cream*

|  | Percent |
|---|---|
| Sodium monofluorophosphate | 0.76 |
| Aluminum oxide trihydrate | 1.0 |
| Insoluble sodium metaphosphate | 41.85 |
| Anhydrous dicalcium phosphate | 5.0 |

| | |
|---|---|
| Sodium N-lauroyl sarcoside | 2.0 |
| Citric acid | 0.25 |
| Glycerine | 13.0 |
| Sorbitol | 20.0 |
| Water | 13.4 |
| Irish moss gum | 0.75 | the balance of the formulation being small amounts of preservative, soluble saccharin, color and flavor. This dental cream has a pH of about 5.8. It exhibits satisfactory stability in effectiveness and physical properties during aging. Other base formulas with suitable variations, e.g. 0.8–0.9 sodium carboxymethylcellulose as the gum, may be employed also.

*Examples II and III.—Dental creams in percent*

| | II | III |
|---|---|---|
| Sodium monofluorophosphate | 0.76 | 0.76 |
| Aluminum oxide trihydrate | 1.0 | 1.0 |
| Insoluble sodium metaphosphate | 41.9 | 41.9 |
| Anhydrous dicalcium phosphate | 5.0 | 5.0 |
| Sodium N-lauroyl sarcosinate | 1.0 | |
| Sodium lauryl sulfate | 0.75 | |
| Sodium hydrogenated coconut monoglyceride sulfate | | 2.0 |
| Citric acid | 0.25 | 0.11 |
| Sodium citrate | | 0.22 |
| Humectants (glycerine and sorbitol) | 27 | 27 |
| Water (with color, flavor, gum, preservative) | Balance | Balance |
| Approx. pH | 5.5 | 5.5 |

As stated, the dental creams I, II and III were found effective against tooth decay in clinical tests and also particularly stable upon aging over periods of many months to several years.

Various other materials may be incorporated in such dentifrice preparations. Added materials in the formulation may be suitably selected and used in proper amount depending upon the particular type of preparation. Such materials as soluble saccharin, flavoring oils (e.g. oils of spearmint, peppermint, wintergreen), coloring or whitening agents (e.g. titanium dioxide), preservative (e.g. sodium benzoate), emulsifying agents, acidifying agents (e.g. citric acid), silicones, alcohol, menthol, chlorophyll compounds (e.g. sodium copper chlorophyllin), and the like may be used. Antibiotics such as penicillin, tetracycline, and tyrothrycin may be added also.

Although the present invention has been described with reference to particular embodiments and examples, it will be apparent to those skilled in the art that variations and modifications of this invention can be made and that equivalents can be substituted therefor without departing from the principles and true spirit of the invention.

Having thus described the invention, what is claimed is:

1. A dentifrice preparation which comprises sodium monofluorophosphate and a water-insoluble compatible polishing material comprising a mixture of a major proportion of an insoluble alkali metal metaphosphate and a minor proportion of a material selected from the group consisting of insoluble calcium and magnesium polishing agents.

2. A dentifrice preparation comprising sodium monofluorophosphate which releases monofluorophosphate ions in water in an effective amount above 0.01 percent fluorine to a maximum of about 1 percent fluorine and at least about 20 percent by weight of water-insoluble compatible polishing material which does not substantially remove said monofluorophosphate ions from aqueous solution, said compatible polishing material comprising a mixture of a major proportion of an insoluble alkali metal metaphosphate and a minor proportion of a material selected from the group consisting of insoluble calcium and magnesium polishing agents, said dentifrice preparation maintaining said sodium monofluorophosphate available for the protection of the teeth upon aging of said dentifrice preparation.

3. A dentifrice preparation in accordance with claim 2 wherein the sodium monofluorophosphate is in an amount from about 0.05 to 2 percent by weight of the dentifrice and said compatible polishing material comprises a mixture of insoluble sodium metaphosphate and an insoluble calcium-containing polishing agent in a ratio from about 100:1 to about 3:2 by weight.

4. A dentifrice preparation in accordance with claim 2 wherein the sodium monofluorophosphate has substantially the following characteristics: above 12 percent total fluoride, up to about 1.5 percent free sodium fluoride and at least about 12 percent sodium monofluorophosphate.

5. A dentifrice preparation in accordance with claim 2 which contains 0.05 to 10 percent by weight of a water-soluble organic synthetic detergent.

6. A dentifrice preparation which comprises about 0.05 to 2 percent by weight of sodium monofluorophosphate, at least about 20 percent by weight of a compatible polishing material comprising a mixture of a major proportion of water-insoluble sodium metaphosphate polishing agent and a minor proportion of a water-insoluble material selected from the group consisting of calcium and magnesium polishing agents, and 0.5 to 10 percent by weight of a water-soluble, organic anionic synthetic detergent.

7. A dentifrice preparation in accordance with claim 6 which contains a water-soluble detergent salt selected from the group consisting of higher fatty acid monoglyceride monosulfate, higher alkyl sulfate, alkyl aryl sulfonate and higher fatty acid ester of 1,2-dihydroxy propane sulfonate.

8. A dentifrice preparation in accordance with claim 6 which contains 0.5 to 5 percent by weight of a substantially saturated higher fatty acid sarcoside compound having about 12 to 16 carbon atoms in the acyl radical and additionally less than 15 percent based upon said sarcoside of higher fatty acid material, the amount of said fatty acid material being insufficient to substantially adversely affect said sarcoside.

9. A dental cream which contains sodium monofluorophosphate in an amount from above 0.01 percent to a maximum of about 1 percent fluorine and at least about 20 percent by weight of a water-insoluble polishing material compatible therewith comprising a major proportion of insoluble alkali metal metaphosphate and a minor proportion of a material selected from the group consisting of calcium and magnesium polishing agents and about 0.5 to 5 percent by weight of water-soluble anionic, organic synthetic detergent, said ingredients being proportioned in an aqueous medium to form a dental cream.

10. A dental cream in accordance with claim 9 which contains about ¼ to 10 percent by weight of hydrated aluminum oxide.

11. A dental cream having the following approximate formulation by weight:

| Ingredients— | Percent |
|---|---|
| Sodium monofluorophosphate | 0.05–2 |
| Water-insoluble compatible polishing material | 40–60 |
| Water-soluble anionic surface-active material | 0.5–5 | said polishing material comprising a mixture of insoluble sodium metaphosphate and insoluble calcium-containing material, the ratio of said insoluble sodium metaphosphate to said calcium material being from about 100:1 to about 3:2 by weight, said surface-active material being a water-soluble anionic synthetic detergent, said ingredients being proportioned with water, humectant and a gelling agent to form a dental cream having a pH from about 5 to 6.5.

12. A dental cream having the following approximate formulation by weight:

| Ingredients— | Percent |
|---|---|
| Sodium monofluorophosphate | 0.05–2 |
| Insoluble sodium metaphosphate | 42 |
| Calcium phosphate | 5 |
| Water-soluble anionic surface-active material | 0.5–5 | said surface-active material comprising sodium N-lauroyl sarcosinate, said ingredients being proportioned with water, humectant material selected from the group consisting of glycerine and sorbitol, and gelling agent selected from the group consisting of Irish moss gum and sodium carboxymethylcellulose to form a dental cream having a pH from about 5 to 6.5.

13. A dentifrice in accordance with claim 6 which contains a calcium phosphate as calcium polishing agent.

14. A dentifrice in accordance with claim 6 which contains calcium carbonate as calcium polishing agent.

15. A dentifrice in accordance with claim 6 which contains magnesium carbonate as magnesium polishing agent.

16. A dentifrice in accordance with claim 6 which contains a magnesium phosphate as magnesium polishing agent.

17. A dentifrice in accordance with claim 11 which contains a calcium phosphate as the calcium-containing material.

18. A dentifrice in accordance with claim 11 which contains calcium carbonate as the calcium-containing material.

19. A dentifrice in accordance with claim 11 which contains alkali metal higher alkyl sulfate as the surface-active material.

20. A dentifrice in accordance with claim 11 which contains alkali metal N-saturated fatty acyl sarcosinate salts having 12 to 16 carbons in the acyl radical as the surface-active material.

No references cited.

JULIAN S. LEVITT, *Primary Examiner.*

FRANK CACCIAPAGLIA, JR., *Examiner.*